US008320893B2

(12) United States Patent
Suurmeyer et al.

(10) Patent No.: US 8,320,893 B2
(45) Date of Patent: Nov. 27, 2012

(54) METHOD AND SYSTEM FOR CONFERENCE CALLING WITH VEHICLE OCCUPANT

(75) Inventors: Andrea K. Suurmeyer, Northville, MI (US); Mary Ann Adams, Plymouth, MI (US); Edward P. Chrumka, Grosse Pointe Park, MI (US); Reni George, Troy, MI (US); Bradley O. Williams, Oxford, MI (US)

(73) Assignee: General Motors LLC, Detroit, MI (US)

( * ) Notice: Subject to any disclaimer, the term of this patent is extended or adjusted under 35 U.S.C. 154(b) by 1428 days.

(21) Appl. No.: 11/864,190

(22) Filed: Sep. 28, 2007

(65) Prior Publication Data
US 2009/0088141 A1 Apr. 2, 2009

(51) Int. Cl.
*H04M 3/42* (2006.01)
*B60Q 1/00* (2006.01)
(52) U.S. Cl. ...................... 455/416; 340/425.5
(58) Field of Classification Search ............ 455/556.2, 455/416, 466, 404.1, 575.9, 425, 417, 420, 455/410; 340/425.5, 988, 442; 342/357.14; 379/45, 406.01, 142.17, 88.13
See application file for complete search history.

(56) References Cited

U.S. PATENT DOCUMENTS

| | | | | |
|---|---|---|---|---|
| 2003/0092433 | A1* | 5/2003 | Flannery | 455/416 |
| 2005/0134504 | A1* | 6/2005 | Harwood et al. | 342/357.14 |
| 2006/0199612 | A1* | 9/2006 | Beyer et al. | 455/556.2 |
| 2006/0226960 | A1* | 10/2006 | Pisz et al. | 340/425.5 |
| 2007/0142026 | A1* | 6/2007 | Kuz et al. | 455/404.1 |
| 2007/0155412 | A1* | 7/2007 | Kaltsukis | 455/466 |

* cited by examiner

*Primary Examiner* — Kiet Doan
(74) *Attorney, Agent, or Firm* — Leydig, Voit & Mayer, Ltd.

(57) ABSTRACT

The disclosed system and method provide a mechanism for facilitating a conference call between a telematics subscriber and third parties through a call center. In one aspect, vehicle data may be uploaded data from the telematics unit while maintaining the conference call. The uploaded data may contain GPS location of the vehicle to assist a requester in locating and assisting the vehicle occupant.

17 Claims, 3 Drawing Sheets

METHOD AND SYSTEM FOR CONFERENCE CALLING WITH VEHICLE OCCUPANT

BACKGROUND OF THE INVENTION

One of the fastest growing areas of communications technology is related to automobile network solutions. Many new cars, especially in developed nations, now have some level of telematics service, and with the increasing number and variety of these services, demands on telematics service call centers have also grown.

Typically, a vehicle telematics unit allows communication of voice and data between the vehicle and a remote entity such as another subscriber, emergency response personnel, or a call center. With respect to the latter, a telematics service provider allows a telematics customer service representative to call a vehicle owner or telematics subscriber through the telematics unit to assist the subscriber with its telematics services. Further, a customer service representative may be notified when the subscriber is involved in vehicle accident to assess the need for safety personnel. In addition, a third party may need to locate a subscriber. For example, a relative or emergency response personnel may need to locate a subscriber with known health problems or a potentially dangerous or incapacitating medical condition.

The requester in this case may call a telematics service provider to request that they locate the subscriber. The customer service representative is able to locate the vehicle and communicate with the subscriber. However, the requester cannot communicate directly with the subscriber. In another example, the customer service representative may desire to allow safety personnel to communicate directly with a medically impaired subscriber. Again, however, this has not traditionally been possible.

BRIEF SUMMARY OF THE INVENTION

Within a system that implements the described principles, a telematics customer service representative can create a multi-party conference call between themselves, a requester, and a subscriber. In addition, in keeping with the disclosed principles and examples, a telematics customer service representative may simultaneously upload GPS data from the telematics unit to provide safety personnel the location of the subscriber while maintaining the conference call.

More generally, in one aspect the disclosed principles allow a requester (e.g. subscriber relative, friend, safety personnel, etc.) to conference call a vehicle occupant in a telematics unit equipped vehicle assisted by a telematics customer service representative. The term "requester" as used herein indicates a third party aide from the subscriber and the call center representative, and may include parties who receive a call without having actually requested such. In addition, in another aspect the disclosed system allows a customer service representative to upload data from the telematics unit while maintaining a conference call. The uploaded data may contain, for example, GPS location data for the vehicle to aid a requester in finding and assisting the vehicle.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
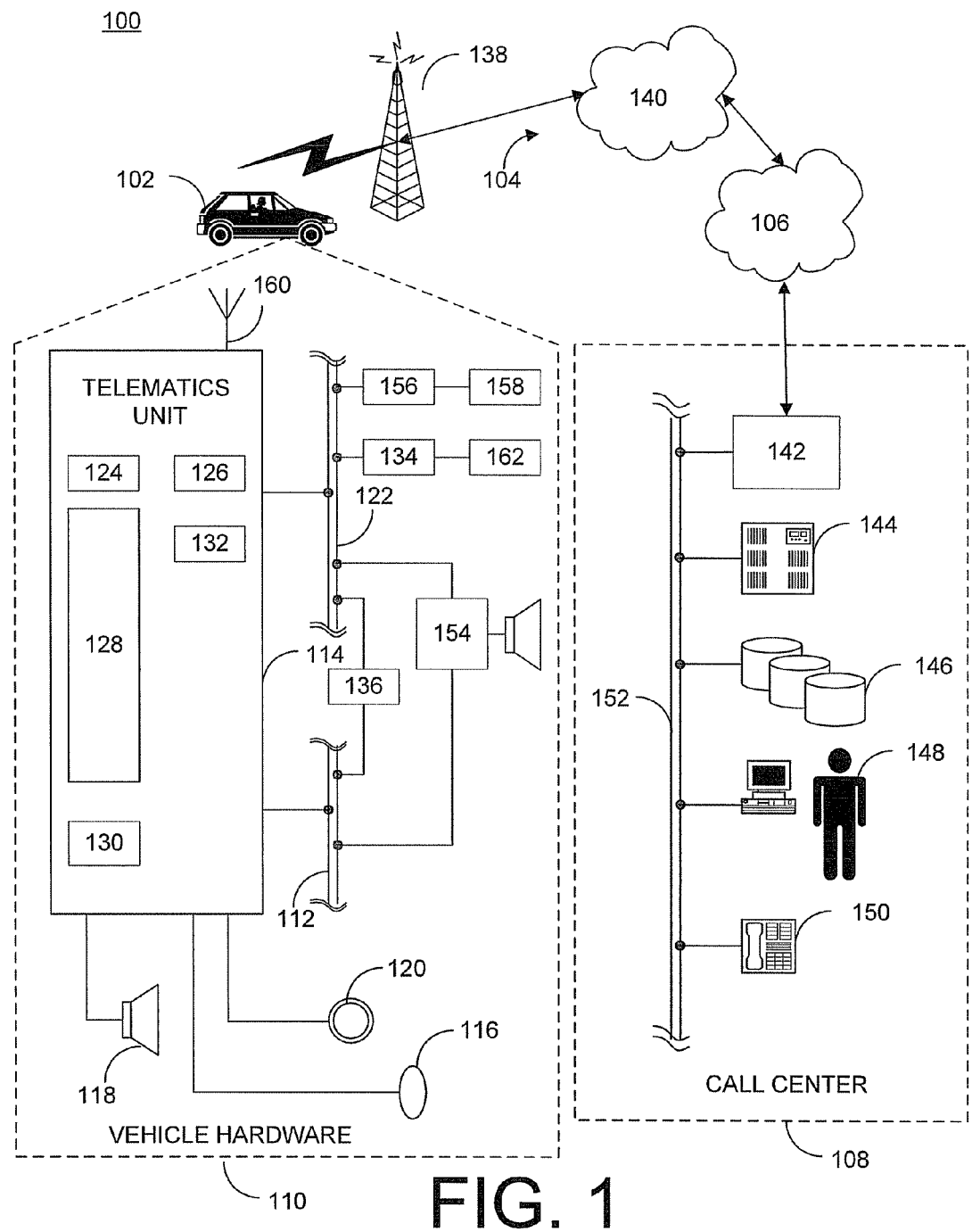
FIG. 1 is a schematic view of a communication system within which examples of the present invention may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with the call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to name a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and/or data.

Figure 2:
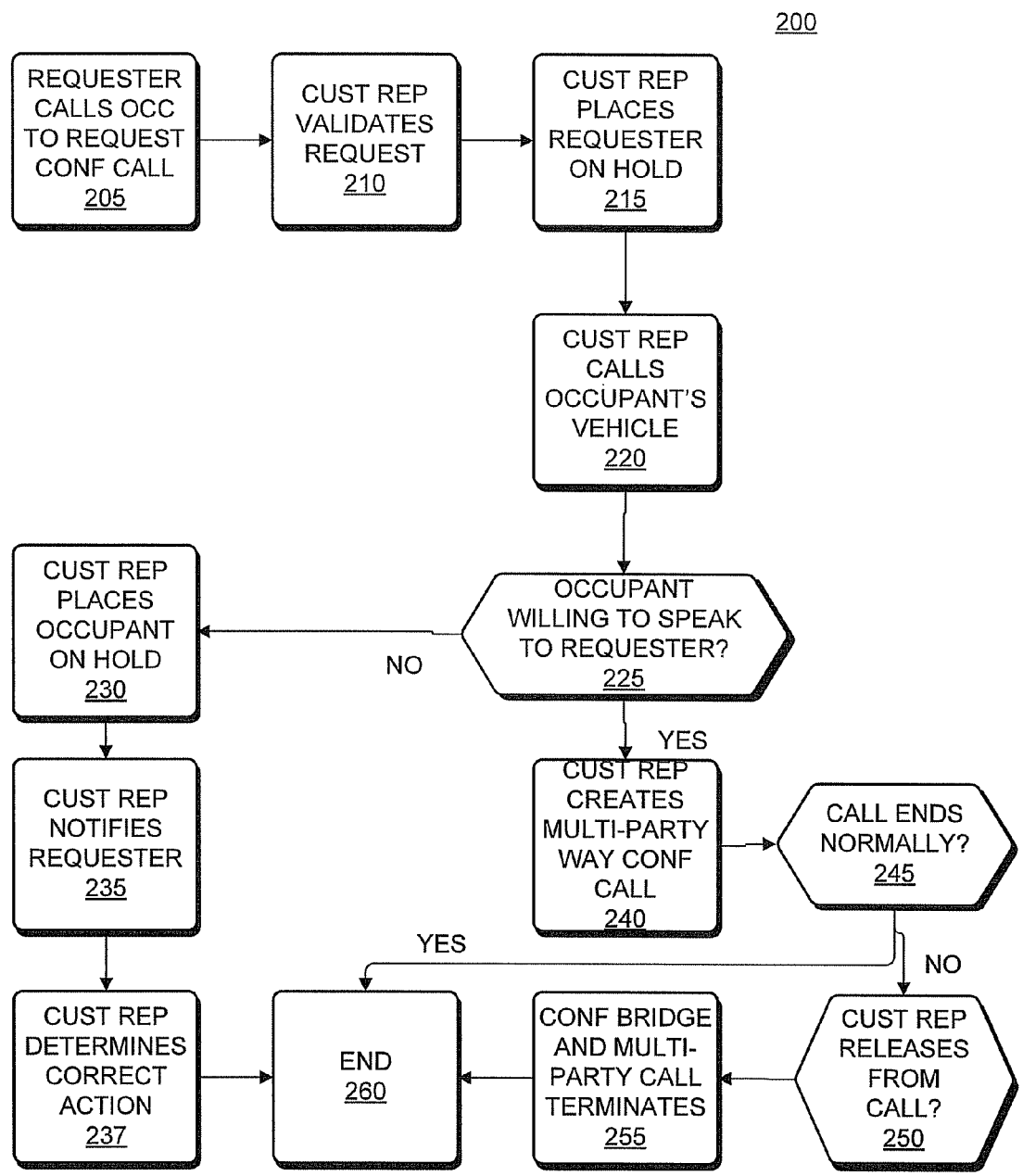
FIG. 2 is a flow diagram illustrating an exemplary method for establishing a conference call between a vehicle occupant, customer service representative, and requester.

As noted above, it has not traditionally been possible for a third party requester to communicate directly with the subscriber via conference call with the call center. FIG. 2 is a flow diagram 200 illustrating an exemplary method for establishing a conference call between a vehicle occupant, a telematics customer service representative, and a requester. A telematics service provider may allow a subscriber's close relative or safety personnel to communicate with a vehicle occupant during emergency situations. For example, an elderly person with slight but not severe health problems may be missing for several hours. The son or daughter of the elderly person may request a telematics service provider to call the elderly person's vehicle to determine whether she is with her vehicle. A customer service representative may call the vehicle occupant and then bridge a conference call between the vehicle occupant, customer service representative, and the requester. It is to be understood that the terms live advisor 148 and customer service representative (FIG. 3, 340) are used interchangeably.

At a stage 205 of the illustrated conference process 200, a requester calls a telematics service provider call center and requests a conference call with the vehicle occupant of a telematics unit equipped vehicle. A requester may be a close relative searching for the vehicle occupant, or public safety personnel assessing the medical condition of the occupant. At a next stage 210, the customer service representative validates the request (i.e. confirms requested subscriber's information and status) and acquires the requester's contact information. At a next stage 215, the customer representative optionally places the requester on hold.

The customer service representative then places an outbound "Emergency Auto-Answer" call at stage 220 to the occupant's vehicle. As used herein an "Emergency Auto-Answer" call is an incoming call that the vehicle occupant may answer hands-free. At a next stage 225, the customer service representative determines whether the vehicle occupant is willing to speak with the requester. If so, at a next stage 240, the customer service representative establishes a multi-party conference call bridge including requester, customer service representative, and vehicle telematics unit, allowing the vehicle occupant and the requester to communicate with each other. Third party entities, such as, for example Public Safety Answering Points (PSAPS), emergency response personnel, and/or law enforcement agencies may be included in the conference call.

At a next stage 245, the customer service representative determines whether the conference call concludes normally. If so, the process ends 260. If not, at a next stage 250, the customer service representative may decide to release from the call. If the customer service representative decides to release from the call, then the conference call bridge is discontinued and the multi-party conference call terminates at stage 255. The process ends at stage 260.

However, if at a stage 225, the vehicle occupant is not willing to speak with the requester, then at a next stage 230, the customer service representative places the vehicle occupant on-hold or terminates the call with them. At a next stage 235, the customer service representative places the requester off hold, and informs them that the vehicle occupant does not wish to communicate with them. At stage 237, the customer service representative optionally takes any additional steps deemed necessary or advisable in the particular circumstances and the process ends at stage 260. The customer service representative may provide additional services to the requestor and vehicle occupant. In one example, the customer service representative may request additional services from third party entities such as a PSAP and/or law enforcement agency. Additional steps may include terminating the call with the vehicle, requestor and/or third party entity.

Figure 3:
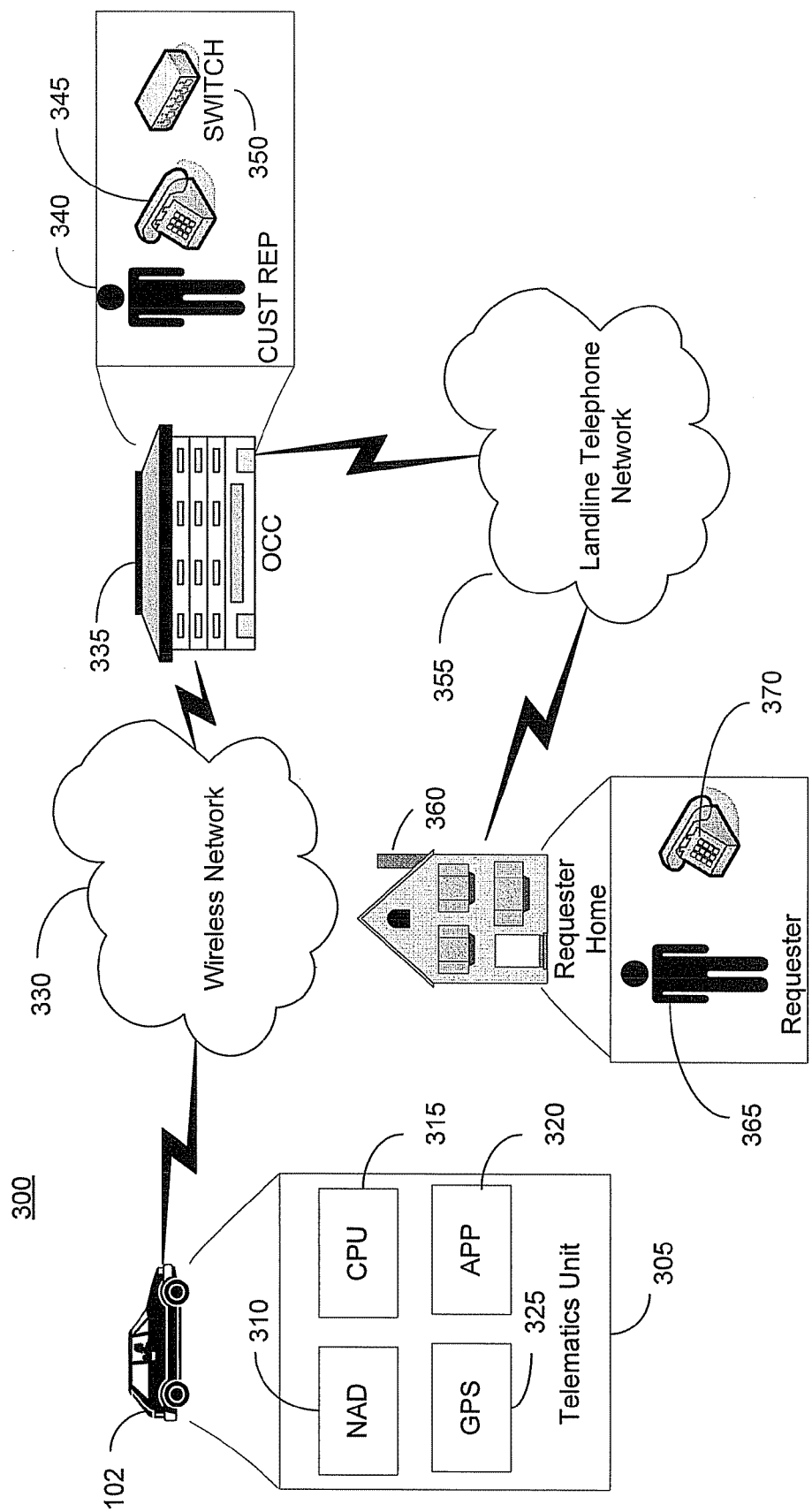
FIG. 3 illustrates a general architectural overview of a system contemplated by an exemplary implementation.

FIG. 3 illustrates a general architectural overview of a system 300 contemplated by an exemplary implementation. Requester 365 calls a customer service representative 340 at a call center 335 across a landline network (355, 370) to locate and determine the well being of the vehicle occupant. The requester 365 may utilize other means to contact a customer service representative, such as, for example, a cellular phone. Following an exemplary method such as that shown in FIG. 2, the customer service representative 340 contacts the vehicle occupant across a wireless network 330. A conference call is established between the requester 365, customer service representative 340 and the vehicle occupant 102, using a switch 350 at a call center and a conference call application 320 residing in the telematics unit 305. The telematics unit may also include a network access device (NAD) 310, CPU 315, and GPS system 325.

The switch 350 is preferably capable of handling at least four channels including a voice channel between the call center and the requester, a voice channel between the vehicle occupant and the call center, a conference call channel between multiple parties, and a data channel between the vehicle occupant and the call center. The data channel allows the customer service representative to upload location information from the telematics unit's GPS system during a conference call. It is to be understood that the data channel may be continuously active, providing persistent location information to the customer service representative. Additional data such as vehicle status and/or diagnostic trouble codes may accompany location. In one example the additional data may include an air-bag deployment indicator. In another example the additional data may include crash notification sensor information. The information may be critical to the requester, for example to locate a medically incapacitated vehicle occupant.

In other implementations, the following features are optionally available as well. In one aspect, the customer service representative may independently place callers on-hold or release them from on-hold condition at any time during the call. Moreover, in one optional aspect, if a customer service representative releases from the conference call, the call is immediately terminated. Further, a customer service representative may have the ability to independently disconnect (terminate) connected parties at any time. In addition, a customer service representative may independently signal any telematics unit equipped vehicles participating in the conference call to switch into "data mode" (or equivalent state) in order to acquire vehicle data (such as location) while the call is in progress.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred implementations of this invention are described herein, including the best mode known to the inventors for carrying out the invention. Variations of those preferred implementations will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for facilitating a conference call with a vehicle occupant in a telematics unit equipped vehicle, the method comprised of:
   receiving a communication at a call center from a requester over a phone line including a request to speak with the vehicle occupant;
   validating the request to speak with the vehicle occupant;
   initiating a call from the call center to the vehicle occupant via a communication over a wireless network to the telematics unit;
   creating a multi-party conference call via a switch at the call center, the conference call including the telematics unit, the call center, and the requester; and, during the conference call uploading to the call center non-voice data contained within the telematics unit,
   wherein initiating a call from the call center to the vehicle occupant via a communication over a wireless network to the telematics unit further comprises determining that the vehicle occupant is willing to communicate with the requester.

2. The method according to claim 1, further comprising storing the uploaded non-voice data into a database associated with the call center.

3. The method according to claim 1, further comprising terminating the conference call.

4. The method according to claim 3, wherein terminating the conference call further comprises determining that the conference call is to be terminated in a normal fashion.

5. The method according to claim 3, wherein terminating the conference call further comprises determining to release from the conference call.

6. The method according to claim 1, wherein the wireless network is selected from the group consisting of wireless wide area networks, wireless metropolitan area networks, wireless local area networks, cDMA2000, Evolution Data Optimized (EVDO), High Speed Downlink Packet Access (HSDPA), GSM, \VIM, and WiMAX networks.

7. A system for conference calling with a vehicle occupant in a telematics unit equipped vehicle, the system comprising:
   a multi-channel switch adapted to process at least three voice channels and one or more data channels, wherein the at least three voice channels include a first voice channel corresponding to the vehicle occupant, a second voice channel corresponding to the call center customer service representative, and a third voice channel corresponding to a third party;
   a database for storing data uploaded from the telematics unit over the data channel; and
   a wireless network for linking the telematics unit with at least one voice channel of the switch and at least one data channel of the switch,
   wherein the telematics unit further comprises a conference call software application residing within a memory of the telematics unit.

8. The system according to claim 7 wherein the telematics unit further comprises a network access device to allow the telematics unit to communicate over the wireless network and a central processing unit implementing a conference call application.

9. The system according to claim 8, wherein the telematics unit further comprises a GPS system that identifies the geographical location of the vehicle.

10. The system according to claim 9, wherein the telematics unit further comprises a cellular device for communicating across the wireless network.

11. The system according to claim 7, wherein the wireless network is selected from the group consisting of wireless wide area networks, wireless metropolitan area networks, wireless local area networks, CDMA2000, Evolution Data Optimized (ENDO), High Speed Downlink Packet Access (HSDPA), GSM, WiFi, and WiMAX networks.

12. A method for facilitating a conference call with a vehicle occupant in a telematics unit equipped vehicle, the method comprised of:
   receiving a communication at a call center from the telematics unit indicating a need for assistance at, the vehicle;
   initiating a call from the call center to tile vehicle occupant via a communication over a wireless network to the telematics unit;
   initiating a call from the call center to a third party;
   creating a multi-party conference call via a switch at the call center, the conference call including the telematics unit, the call center, and the third party; and
   during the conference call uploading to the call center non-voice data contained within the telematics unit,
   wherein receiving a communication at the call center from the telematics indicating a need for assistance comprises receiving an automated communication from the telematics unit.

13. The method according to claim 12, wherein the automated communication from the telematics unit comprises a collision detection notification.

14. The method according to claim 13, wherein the third party comprises emergency response personnel.

15. The method according to claim 12, wherein receiving a communication at the call center from the telematics unit indicating a need for assistance comprises receiving a user-initiated communication from the telematics unit.

16. The method according to claim 12, further comprising transferring the uploaded non-voice data from the call center to the third party.

17. The method according to claim 12, wherein the wireless network is selected from the group consisting of wireless wide area networks, wireless metropolitan area, networks, wireless local area networks, CDMA2000, Evolution Data Optimized (EVDO), High Speed Downlink Packet Access (HSDPA), GSM, Win, and WiMAX networks.

* * * * *